United States Patent [19]

Crancer, Jr.

[11] 4,165,570
[45] Aug. 28, 1979

[54] PEDESTRIAN STREET AND ROAD CROSSING TRAINER AND METHOD

[76] Inventor: Alfred Crancer, Jr., 9021 Stratford La., Alexandria, Va. 22308

[21] Appl. No.: 911,913

[22] Filed: Jun. 2, 1978

[51] Int. Cl.² ............................................ G09B 19/00
[52] U.S. Cl. ...................................................... 35/8 A
[58] Field of Search ................... 35/1, 8 R, 8 A, 11 R, 35/22 R, 48 R; 353/15

[56] References Cited

U.S. PATENT DOCUMENTS

| | | | |
|---|---|---|---|
| 1,564,138 | 12/1925 | Rowland | 35/11 R |
| 3,205,592 | 9/1965 | Wood, Jr. | 35/11 R |
| 3,342,103 | 9/1967 | Fabrey | 353/15 |
| 3,480,738 | 11/1969 | Meyer et al. | 35/8 A |
| 3,488,861 | 1/1970 | Jones et al. | 35/11 R |
| 3,809,364 | 5/1974 | Redemann | 353/15 |

OTHER PUBLICATIONS

Washington Post Article "Main Intersection of Safety Town"; Dec. 7, 1939, Section 2, p. 15.

Primary Examiner—William H. Grieb
Attorney, Agent, or Firm—Wigman & Cohen

[57] ABSTRACT

A method of and audio/visual apparatus for training and testing pedestrians, especially children, in the safe transit of roadways, intersections and crosswalks are disclosed. The apparatus comprises an automated system including a pair of image projectors arranged to project a sequence of images from two groups of images in generally confronting relation across a spacing defining a pedestrian passage. The images include scenes corresponding to roadway views as seen in opposite directions from a marginal edge of the roadway. Some of the images depict an unsafe crossing condition for a pedestrian, such as, for example, a roadway scene with a travelling motor vehicle. A signaling device generates an audible and/or visual signal whenever an image of an unsafe crossing condition appears on either screen. A control device is operatively connected to both the signaling device and the image projectors to advance the projectors in accordance with a predetermined program and to activate the signaling device when an unsafe crossing condition appears. Audio voice instruction is also provided in synchronism with the projected images for conducting a repetitive training cycle for the pedestrian trainee/testee.

18 Claims, 4 Drawing Figures

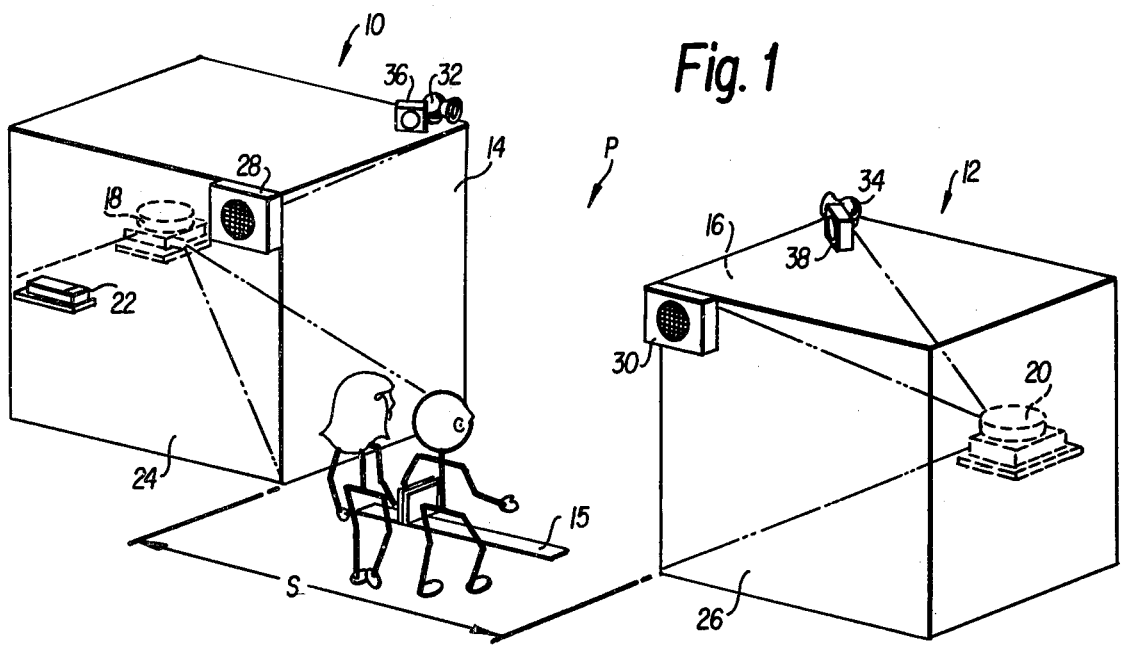
Fig. 1
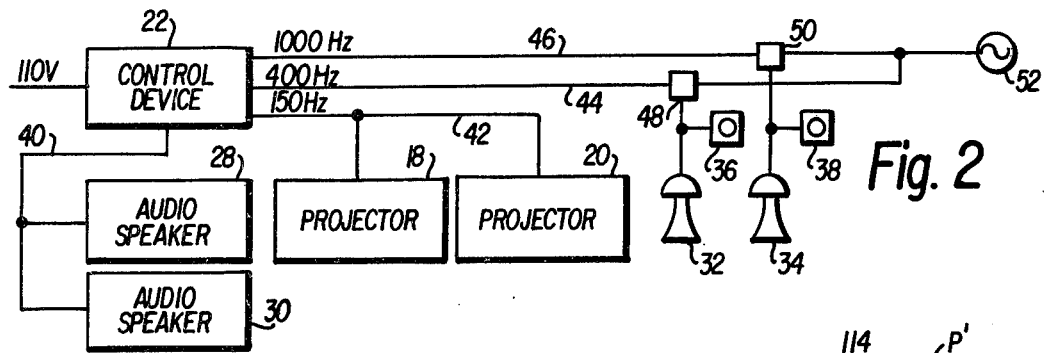
Fig. 2
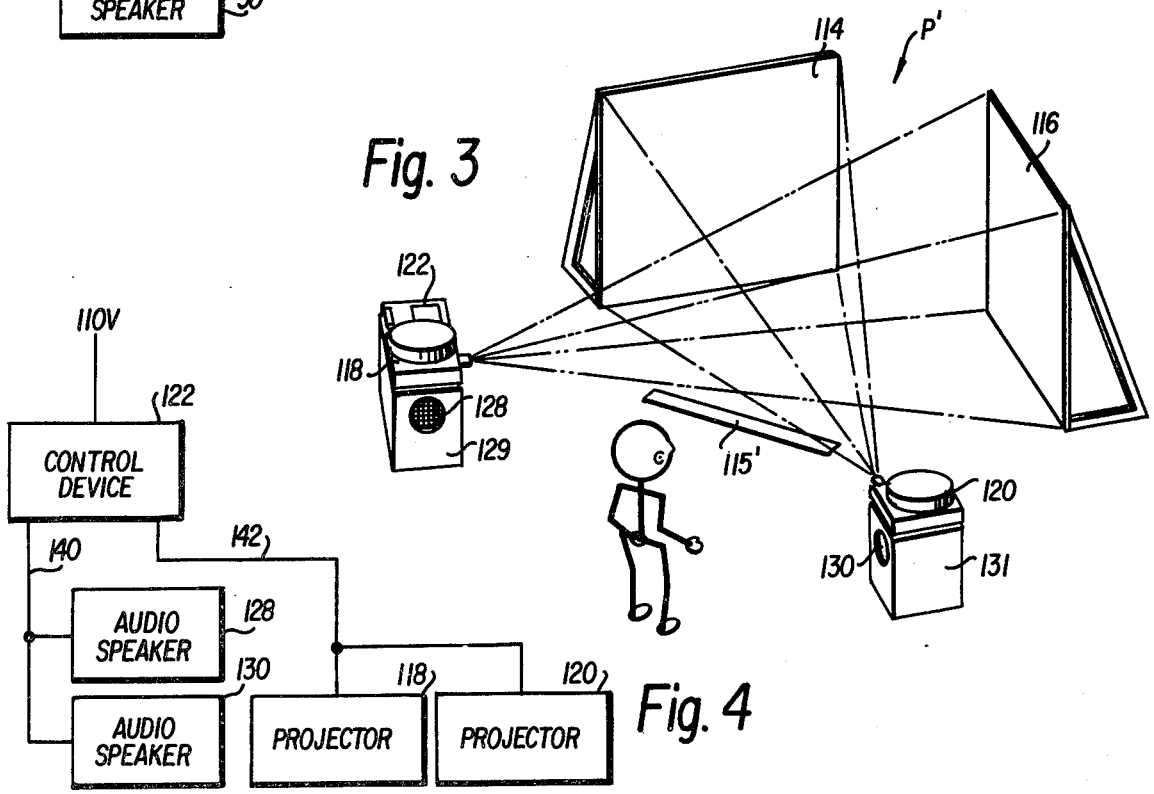
Fig. 3
Fig. 4

4,165,570

PEDESTRIAN STREET AND ROAD CROSSING TRAINER AND METHOD

BACKGROUND OF THE INVENTION

The present invention relates to education and more particularly to a method of and audio/visual apparatus for training and testing pedestrians, especially children, in the safe transit of roadways, intersections, crosswalks and the like.

One of the most appalling statistics arising from the operation of motor vehicles in this country is the number of pedestrians, particularly young children, who are killed or seriously and permanently injured by motor vehicles as they cross roadways and street intersections. One of the underlying causes for this unfortunate situation is the inadequacy of pedestrian safety training and testing programs and devices presently in use and, in some cases, the total absence of pedestrian safety training for children. Although the prior art is replete with methods and apparatus for training and testing operators of motor vehicles, it is notably deficient in effective methods and apparatus for performing training and testing of pedestrians.

A search of the prior art failed to uncover any prior art reference which discloses the pedestrian training and testing method and apparatus of the present invention. Several prior art patents were uncovered which disclose driver training apparatus or other audio/visual apparatus including elements similar to those of the apparatus of the present invention and the following is a listing of such prior art patents;

U.S. Pat. No. 3,205,592
U.S. Pat. No. 3,342,103
U.S. Pat. No. 3,488,861
U.S. Pat. No. 3,809,364

In addition to the above-listed patents, the aforesaid prior art search uncovered an article appearing in the Washington Post on Thursday, Dec. 7, 1939, entitled "Main Intersection of Safety Town." This article relates to pedestrian training conducted under the auspices of the Automobile Association of America and describes a training program involving the use of a miniature street intersection, standard stop-and-go signals and toy, child-propelled automobiles, in conjuction with youth safety patrols, for staging a pedestrian and motor vehicle driver safety demonstration at an elementary school in Washington, D.C. Insofar as known, this type of "safety town" equipment and training procedure and variations of the same constitute the basis of the prior art pedestrian training for children.

While such programs are certainly useful and desirable in the training of youthful pedestrians, the equipment used for this type of training requires a substantial deployment area and is not readily transported from place to place. Moreover, it is often not feasible for individual schools and other organizations to purchase and store the equipment necessary to conduct "safety town" training because of the relatively large monetary investment involved, the lengthy assembly and disassembly time required, as well as the need to provide substantial storage area for the equipment when it is not in use.

A further and particularly significant disadvantage of the prior art "safety town" is the fact that the training is conducted under the control of both traffic signals and safety patrols and, thus, does not provide a training environment for the traffic situations most often encountered by young pedestrians, such as completely uncontrolled intersections and residential streets in the child's neighborhood, for example.

As is well known, the most effective training methods, especially for children, involve repetitive and continuous reinforcement of a particular behavior pattern. In pedestrian safety training of children, it is almost essential to success that virtually instinctive behavior patterns are developed in the children and it is to this end that the present invention was conceived.

SUMMARY AND OBJECTS OF THE INVENTION

In view of the foregoing limitations and shortcomings of the prior art methods and apparatus, as well as other disadvantages not specifically mentioned above, it should be apparent that there still exists a need in the art for an effective method and apparatus for training youthful pedestrians to safely cross motor vehicle roadways.

It is, therefore, a primary objective of this invention to fulfill this need by providing a pedestrian street and road crossing training/testing method and apparatus which is characterized by the provision of repetitive, reasonably realistic visual simulations of street and road situations with motor vehicle traffic combined with an audible and/or visual feedback perceptible to the pedestrian trainee/testee as to the correctness of a decision to cross the roadway after viewing a particular simulated traffic situation.

More particularly, it is an object of this invention to improve pedestrian safety habits by providing a method which includes a repetitive training procedure with auditory instruction and audio and/or visual feedback to the trainee and, thereafter, a procedure for testing the trainees to evaluate the effectiveness of the training procedure and by providing an automated audio/visual apparatus which includes a pair of generally confronting screens upon which are displayed, by means of still or motion picture projectors, images depicting actual scenes of a street or roadway as viewed in opposite directions, recording/reproducing apparatus operatively coupled to the projectors for providing voice training instructions in synchronism with the projected images and an audio and/or visual signaling device also synchronized with the projected images to provide feedback to the pedestrian trainee/testee as to the correctness of a decision to cross after viewing the simulated traffic situation.

It is another object of this invention to provide a pedestrian training and testing method and apparatus which is practiced and operated in a totally safe environment, but which simulates actual street and road crossing traffic situations.

Yet another object of this invention is to provide a method and apparatus by which pedestrians, particularly children, are enabled to develop, practice and be tested with respect to proper physical action, visual acuity and judgment.

Still another object of this invention is to provide a pedestrian training and testing apparatus which can be readily assembled and disassembled, requires little storage space and is of relatively low cost to thereby permit its widespread use by schools, automobile associations, traffic safety organizations, local police and the like.

Briefly described, the aforementioned objects of the invention are accomplished according to its apparatus aspects by providing, in a preferred embodiment, an automated audio/visual system comprising two image projection screens arranged in spaced, confronting relation to one another to define therebetween a pedestrian passage through which the trainee/testee is enabled to pass. A still image projector, such as a conventional carousel slide projector, is arranged rearwardly of each screen for projecting images onto the screens in a predetermined, synchronized sequence. The slides for one projector depict scenes of a roadway as viewed in one direction of the roadway, preferably, from a point at or adjacent the curb or marginal edge of the roadway and the slides for the other projector depict similar scenes, but as viewed in the other roadway direction. At least some of the slides for each projector depict a vehicle on the roadway scene, such vehicles including, but not being limited to, automobiles, trucks and other motor vehicles as well as bicycles. The type and relative position of the vehicle along the roadway of the last-mentioned slides is preferably varied so as to provide the additional possiblity of testing for visual acuity and judgment of the trainee/testee as will be more fully described hereinafter.

Operatively associated with each projector is an audio or visual signaling device or both, for example, an automobile horn or a siren and/or a continuous or flashing red light, which devices automatically provide aural and/or visual signals when a slide displayed on either one or both screens depicts a roadway scene with a pedestrian danger, thereby indicating that an unsafe crossing condition exists.

The system also includes a control device for automatically and synchronously advancing the slide projectors and actuating the audio and/or visual signaling device and, in the preferred embodiment, the control device comprises a conventionally available tape recorder/reproducer having an audio output as well as a plurality of output circuits which produce output voltages of discrete frequencies for controlling ancillary apparatus in response to signals recorded on the tape recording medium. These output circuits are operatively connected to the slide advance circuits of the projectors and to the circuits of the audio and/or visual signaling devices for each projector.

According to the method aspects of the invention, as it relates to pedestrian training, the tape recording medium used in the tape recorder, such as a tape cassette or cartridge, is programmed with both audio voice training instructions and recorded signals for activating the output circuits which control the projector advance mechanisms and the actuation of the circuits of the signaling devices. Thus, when the system is arranged and connected and described above and placed into automatic operation for training a pedestrian, images are projected in sequence onto the screens and, synchronously therewith, recorded audio voice instructions are generated and transmitted to the pedestrian trainee by speakers connected to the audio output of the tape recorder. While the content of the voice instruction program may vary, a preferred program includes an introductory explanation of the general procedure to be followed by the pedestrian trainee, desirably including illustratory examples and display of traffic situations on the screens with and without vehicle images, together with the activation of the signaling device in the former situation indicating that an unsafe crossing condition exists. Thereafter, the program proceeds with the training cycle by voice instructions to the trainee to place himself at a designated initial crossing position adjacent the pedestrian passage followed by voice commands, such as "STOP! LOOK LEFT, LOOK RIGHT, LOOK LEFT," to which the trainee responds accordingly. By following the prescribed commands, the trainee will visually perceive the images on both screens and, without further voice instruction, will then be required to make his own decision whether or not conditions are sufficiently safe to transit the pedestrian passage. If either one or both of the projected images includes an unsafe crossing condition, an output signal is transmitted from the tape recorder to the appropriate signaling device circuit to sound an automobile horn, for example. Thus, the trainee receives satisfaction when he makes a correct decision to cross in a safe traffic condition or not to cross in an unsafe condition and learns by his mistake if he makes an incorrect decision to cross when it is not safe to do so.

It is, as previously mentioned, possible to vary the content of the instructional program and visual image display from that described above. For example, it would be within the contemplation and scope of the invention to provide a more sophisticated training program including images which depict parked motor vehicles or the rear of vehicles which have just passed the crossing, both representing no pedestrian danger, other pedestrians crossing when an unsafe traffic situation exists, attention distracting scenes, such as a group of children playing across the roadway, vehicles which are at too great a distance to represent a danger, the advance of the left image from a safe traffic situation to an unsafe traffic situation after the voice command "LOOK RIGHT" and many other variations which will be apparent to those skilled in the art from the disclosure set forth herein.

According to the testing aspects of the method of the present invention, the voice command may be eliminated entirely or replaced, for example, by an audible tone to indicate the start of each traffic situation display. In this way, it can be determined if a previous training program in safe crossing has been effective in teaching the pedestrian to first stop at the curbside, look left, right and again left before crossing a roadway. A further testing possibility involves the deployment and operation of the system in close proximity to school and classroom doorways, corridors and the like to provide frequent and repetitive testing and reinforcement of the desired pedestrian behavior.

While the preferred embodiment contemplates the use of rotary magazine slide projectors and tape cassette recorders, it should also be understood that the invention is not intended to be limited thereby, since many forms of image displays, including motion picture projectors, and other audio reproducing devices and signaling devices could be employed in the practice of the invention.

With these and other objects, advantages and features of the invention that may become hereinafter apparent, the nature of the invention may be more closely understood by reference to the following detailed description of the invention, the appended claims and to the several views illustrated in the attached drawings, wherein:

BRIEF DESCRIPTION OF THE DRAWINGS

FIG. 1 is a perspective view of one embodiment of the apparatus of the invention showing an arrangement for rear-projection onto the screens;

FIG. 2 is an electrical schematic, in block diagram form showing the various connections of the apparatus of FIG. 1;

FIG. 3 is a perspective view of a simplified, alternate embodiment of the apparatus of the invention showing front-projection onto the screens; and FIG. 4 is an electrical schematic, in block diagram form, showing the various connections of the apparatus of FIG. 3.

DETAILED DESCRIPTION OF A PREFERRED EMBODIMENT

Referring now in detail to the drawings, there is illustrated in FIG. 1 the automated pedestrian street and road crossing training and testing apparatus of the invention comprising a pair of spaced apart, generally box-like enclosures 10, 12 on the confronting sides of which are provided image projection screens 14, 16. The screens are of a type suitable for displaying images projected from within the enclosures, i.e., from the rear of the screens. Conventional slide projectors 18, 20 having remotely controllable slide advance mechanisms are arranged within the enclosures on suitable mountings or shelves in such a way as to project images onto the rear surface of the screens. The slide projectors 18, 20 may be of the rotary magazine type projector, such as those manufactured by the Kodak Company of Rochester, N.Y., under the trademark designation CAROUSEL, which can accommodate approximately 80 individual slide transparencies.

Within enclosure 10, there is provided a system control device 22 comprising an audio tape recorder/reproducer which, in the described embodiment, is a conventional cassette tape recorder of a type which has, in addition to the usual audio output circuit, output circuits for remotely controlling ancillary equipment in response to recorded signals on the tape recording medium. One recorder which is suitable for use with the Kodak rotary magazine slide projector mentioned above is manufactured by Optisonics HEC Corporation, Tucson, Ariz. under the designation Sound-O-Matic, Universal Model No. 10-6401. This particular apparatus includes three output circuits which produce control voltages at frequencies of 150 Hz, 400 Hz and 100 Hz.

The enclosures 10, 12 are spaced from each other a distance S which defines a substantially unobstructed pedestrian passageway P therebetween. Arranged transversely of the passage P, affixed to the surface which supports the enclosures, is a strip of tape 15 or the like, the purpose of which is to designate the curb or marginal edge of the roadway at which the pedestrian trainee stands at the beginning of an image sequence.

At the upper corners of outer sides 24, 26 of each enclosure, there is provided a respective audio speaker 28, 30, each of which is connected to the audio output of the control device or recorder/reproducer 22. Mounted on the top of each enclosure at the side thereof opposite the speakers are audio and visual signaling devices, such as automobile horns 32, 34 and lights 36, 38, the latter of which may comprise flashing red lights.

Describing now FIG. 2, which schematically illustrates the various electrical connections of the components of the system of FIG. 1, the control device or recorder/reproducer 22 is powered in a conventional manner by a 110 volt source and provides an audio output to the speakers 28, 30 via a wire 40. Three output wires 42, 44, 46 are connected to a respective output circuit of the control device 22, which circuits produce, respectively 150 Hz, 400 Hz and 1000 Hz signals. Wire 42 is connected to the remote control slide advance input of each projector 18, 20 for controlling the slide advance of the projectors in accordance with a predetermined program recorded on the tape medium in a conventional and, therefore, not particularly described manner. Wires 44 and 46 are connected to respective, normally-open switches 48, 50 arranged in circuit with a voltage source 52 for supplying power to operate lights 36, 38 and horns 32, 34. When, for example, a 400 Hz signal is produced on line 44, switch 48 is caused to close and complete the circuit with power source 52 to thereby supply power for simultaneously energizing light 36 and horn 32. Similarly, the closing of switch 50 with a 1000 Hz signal on wire 46 provides power to simultaneously energize light 38 and horn 34.

Operation of the system proceeds as follows in accordance with a program recorded on the tape cassette according to the above-described method. The audio voice instruction and the 150 Hz slide advance signal are recorded on the tape approximately every four to five seconds so that a complete program of two groups of eighty slides has approximately a five to six minute duration, although longer or shorter program duration times or continuous program recycling for the full duration of the tape recording medium are, of course, possible. Signals for the 400 Hz and 1000 Hz output circuits are also recorded on the tape as appropriate. When one of a pair of slides in the projecting sequence depicts an unsafe crossing scene, for example, when an automobile representing a danger appears in the scene of the image projected on screen 14, the program on the tape recording medium causes activation of the associated output circuit which supplies a voltage at a frequency of 400 Hz to wire 44 to close switch 48 thereby completing the circuit between the voltage source 52 and light 36 and horn 32. Thus, if the pedestrian trainee has walked from the stop line or curb designation tape 15 into the passage P between the screens 14, 16, he will perceive audio and visual signals only from the direction of the danger, namely, from the left. The 1000 Hz circuit operates in substantially the same manner. The slides of each projector which depict unsafe crossing scenes are preferably arranged in random sequence in each projector and the recording tape medium is programmed according to this arrangement. The desired voice instructions and commands are recorded on the audio portion of the tape medium in accordance with the method principles outlined above.

FIG. 3 illustrates a more simplified arrangement of the pedestrian training apparatus of the invention and comprises a pair of spaced screens 114, 116 arranged in angular, but generally confronting relation to one another. In this embodiment, a pair or projectors 118, 120, which may be identical to the projectors 18, 20 of FIG. 1, are arranged to project images on the front of a respective screen 114, 116. A substantially unobstructed pedestrian passage P' is defined between the screens across which the pedestrian trainee may transit from a curb designation tape or stop line 115'. Audio speakers 128, 131, are located on opposite sides of the stop line and provide supports for the projectors 118, 120. A control device or recorder/reproducer 122 similar to control device 22 of FIG. 1 is also located on the housing 129 adjacent projector 118.

Referring now to FIG. 4, the simplicity of this embodiment of the invention will be apparent. The audio output of the control device 122 is connected via a wire 140 to both speakers 128, 130. Control device 22 has only a single output circuit for remotely controlling the slide advance mechanisms of the projectors 118, 120 and is connected to both projectors by a wire 142. Audio signals, such as the sound of an automobile horn, indicating that an unsafe crossing condition exists are recorded directly on the audio voice instruction and command track of the recording medium and, thus, emanate from the speakers 128 and 130.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A method of training/testing pedestrians, especially children, in the safe transit of roadways, street intersections and the like comprising the steps of:

displaying two generally confronting images of two groups of images at a spaced distance from each other, said spaced distance defining a passage for the transit of a pedestrian trainee/testee, said two groups of images including scenes corresponding substantially to respective opposite views of a roadway, at least one of the images of one group of images depicting the presence of a pedestrian danger in the roadway scene, said one image providing an indication of an unsafe crossing condition; and producing a signal perceptible to the trainee/testee when an unsafe crossing condition is indicated by said one image.

2. The method according to claim 1, including a training step of producing an instruction signal for perception by the trainee/testee.

3. The method according to claim 2, wherein the step of producing an instruction signal includes generating an audible voice instruction signal in accordance with a predetermined program.

4. The method according to claim 3, wherein said voice instruction signal is repetitive and is generated each time two confronting images of said two groups of images are displayed.

5. The method according to claim 1, wherein said displaying step includes automatically projecting, in a predetermined sequence, the images of each group onto a respective screen arranged on opposite sides of the pedestrian passage and including the step of automatically generating, in synchronism with said predetermined sequence of images, an audible voice instruction signal from an audio recording medium for aural perception by the trainee/testee.

6. The method according to claim 5, wherein each group of images includes a plurality of images indicating unsafe crossing conditions in the roadway scene and wherein the step of producing the signal includes automatically generating said signal whenever a projected image indicates an unsafe crossing condition.

7. The method according to claim 6, wherein said signal includes at least one of a visual and audio signal.

8. The method according to claim 7, wherein said visual signal includes a light signal and said audio signal includes a horn signal.

9. The method according to claim 5, wherein said images are rear-projected onto said screens.

10. The method according to claim 6, wherein the images of each group which indicate unsafe crossing conditions are arranged in random sequence in each group.

11. The method according to claim 5, wherein said projected images are slide transparencies.

12. The method according to claim 1, including the step of providing an indication of the marginal side of the roadway transversely of said pedestrian passage.

13. Apparatus for training/testing pedestrians, especially children, in the safe transit of roadways, intersections and the like comprising:

means for displaying two generally confronting images of two groups of images at a spaced distance from each other, said spaced distance defining a passage for the transit of a pedestrian trainee/testee, said two groups of images including scenes corresponding substantially to respective opposite views of a roadway, at least one of the images of a group of images depicting the presence of a pedestrian danger in the roadway scene, said one image providing an indication of an unsafe crossing condition;

means operatively associated with said displaying means for producing a signal perceptible by said trainee/testee; and control means operatively connected to said displaying means and signal producing means for activating said signal producing means in response to the display of said one image indicating an unsafe crossing condition.

14. The apparatus according to claim 13, including means for producing an instruction signal for perception by the pedestrian trainee.

15. The apparatus according to claim 13, wherein said control means includes tape recording/reproducing means for producing an audible voice instruction signal from an audio recording medium in accordance with a predetermined program corresponding to the sequence of displayed images.

16. The apparatus according to claim 15, wherein said displaying means includes a pair of screens and image projection means associated with each screen for projecting the images of a respective group of images on the screen associated therewith, said control means including means for controlling the projection sequence of said image projection means.

17. The apparatus according to claim 13, wherein each group of images includes a plurality of images indicating unsafe crossing conditions in the roadway scene, said control means being operative to automatically activate said signal producing means in response to the display of an image of said plurality of images which indicates an unsafe crossing condition.

18. The apparatus according to claim 13, wherein said signal producing means includes at least one of a visual and audio signaling means.

* * * * *